United States Patent [19]
Georgopulos

[11] 3,911,217
[45] Oct. 7, 1975

[54] MOUNTING ARRANGEMENT FOR ELECTRICAL COMPONENTS

[75] Inventor: Thomas Georgopulos, Chicago, Ill.

[73] Assignee: GTE Automatic Electric Laboratories Incorporated, Northlake, Ill.

[22] Filed: Aug. 30, 1973

[21] Appl. No.: 393,263

[52] U.S. Cl. ................................. 178/46; 317/99
[51] Int. Cl.² ............... H01F 17/08; H02G 15/12; H01F 27/06
[58] Field of Search .......... 178/45, 46; 317/99, 117, 317/118, 120, 101 CW, 101 R; 336/90, 92; 220/23.4, 23.6; 174/52 R, 58, 59, 63, 65 R

[56] References Cited
UNITED STATES PATENTS

| | | | |
|---|---|---|---|
| 970,194 | 9/1910 | Donaldson et al. | 174/65 R |
| 1,935,918 | 11/1933 | Rhodes et al. | 178/46 |
| 1,995,731 | 3/1935 | Amy et al. | 333/70 S UX |
| 2,353,795 | 7/1944 | Tinnerman | 248/27 X |
| 2,353,796 | 7/1944 | Tinnermann | 248/27 X |

FOREIGN PATENTS OR APPLICATIONS 357,209  9/1931  United Kingdom................... 178/46

*Primary Examiner*—James W. Lawrence
*Assistant Examiner*—Marvin Nussbaum
*Attorney, Agent, or Firm*—David W. Heid

[57] ABSTRACT

A mounting arrangement for a plurality of electrical components is disclosed wherein these components may be included in cases which are stacked in sets on a level-by-level basis. These cases include resilient mounting tabs on each end thereof which cooperate with mounting plates and allow a plurality of cases to be stacked in each layer and subsequent additional layers stacked on top of the first layers.

12 Claims, 5 Drawing Figures

MOUNTING ARRANGEMENT FOR ELECTRICAL COMPONENTS

BACKGROUND OF THE INVENTION

This invention relates generally to the improved mounting arrangement for plurality of electrical components and more particularly to an improved mounting arrangement uniquely suited for mounting a plurality of loading coils used in the field of telephony.

To improve the electrical characteristics of cables such as voice frequency cables used in the telephone communication systems, the cables are spliced at selected intervals and connected with various electrical components, such as loading coils. These components are spliced in series with the conductors of the cable at access enclosures or enclosed cases which include a plurality of these loading coils. Some typical prior art mounting arrangements used to connect a plurality of loading coils to the leads extending outward of the case to be connected in series with the telephone lines are exhibited in for example, Pat. No. 3,526,712 issued to E. L. Drom on Sept. 1, 1970. In this arrangement a plurality of sleeve-like members are stacked one on the other outside of a main cable and individual loading coils are snapped on to the sleeves and then wired to the leads from the cable. Another arrangement for mounting loading coils in a larger case is illustrated in Pat. No. 2,548,199 issued to E. J. Crane et al. on Apr. 10, 1951. In the Crane patent individual loading coils are stacked on a mounting rod with the leads extending from the group of coils ultimately spliced to the incoming cable pairs, and a plurality of these stacks might be included in a larger case stacked generally about the incoming cables to the case. A third patent which is representative of the prior art in this field is No. 3,134,854 issued to J. A. Martin Jr. et al. on May 26, 1964. In the Martin patent a group of loading coils are embedded in a plastic case and these cases stacked on supporting rods which hold the cases in the alignment in the overall enclosure.

SUMMARY OF THE INVENTION

In the present invention a unique and advantageous mounting arrangement for holding a plurality of electrical components, and in particular loading coils, has been devised in which a case including a plurality of loading coils is provided with resilient tabs on each end for insertion into mounting plates on a level-by-level basis. The cases which include these loading coils have terminal means extending from one side to which the loads from an external cable stub may be connected. The mounting plates have apertures included which cooperate with the resilient tabs on the cases so that the cases may be stacked on the mounting plate and provide a level of cases including any desired number. After a first layer of cases have been snapped to a mounting plate a subsequent mounting plate may be snapped onto the opposite end of the cases and an additional layer of cases snapped into an unused portion of the openings on the second mounting plate.

The resilient tabs on one end of the case are oriented at an angle of 90° from the tabs on the opposite end so that when the cases are mounted in a level-by-level basis the terminal means may always be positioned such that they will face outward from the mounting plate to facilitate easy wiring of the cable pairs to the mounting means for each individual coil. From further perusal of the specification it will be appreciated that each layer may include any reasonable number of cases and virtually any number of layers or levels may be stacked by employing additional mounting plates.

DESCRIPTION OF THE PREFERRED EMBODIMENT

Figure 1:
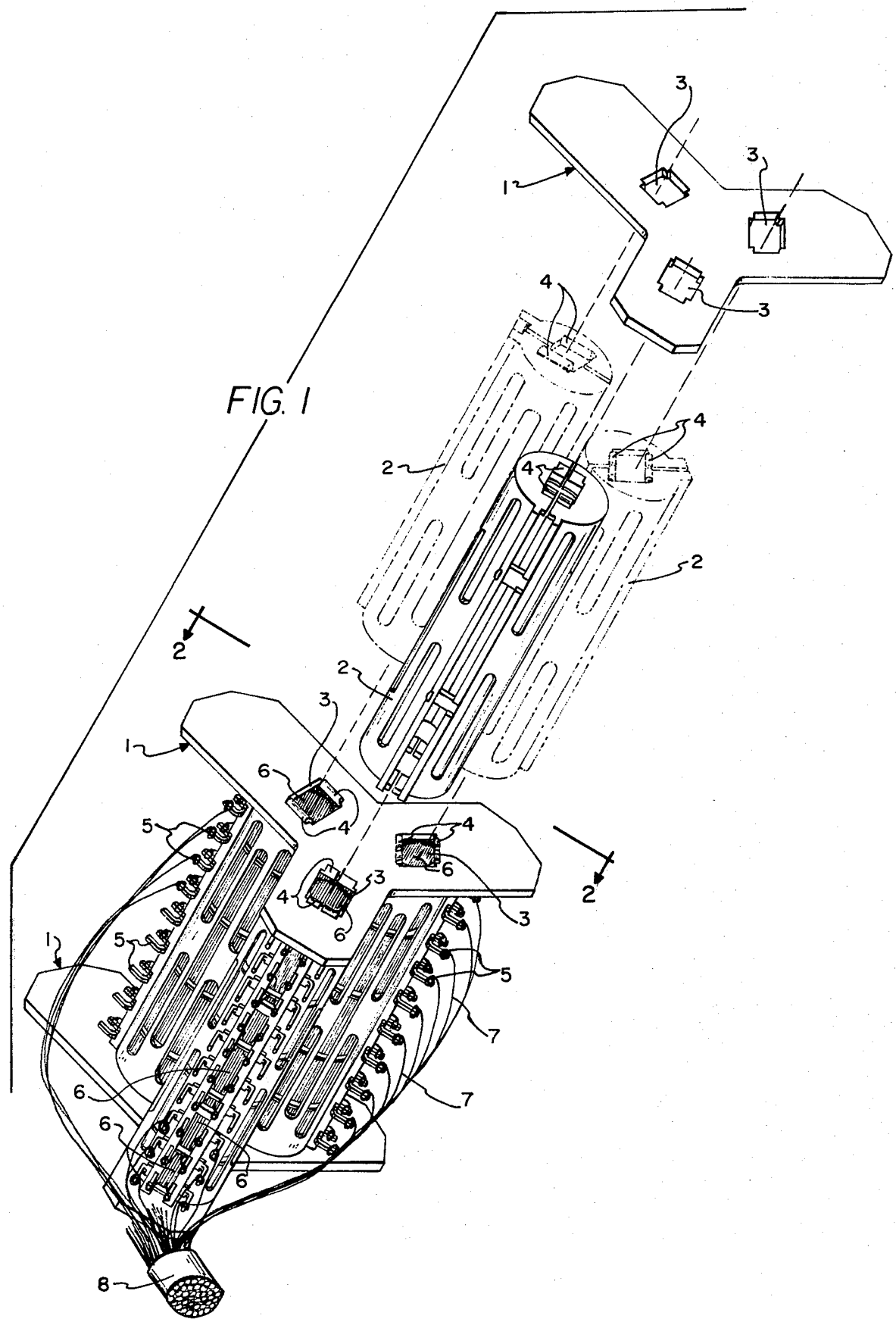
FIG. 1 is a perspective view of a three coil level mounting arrangement of the present invention in which a second layer of coil cases is shown in exploded view as well as a third mounting plate being shown in exploded view above the first two layers.

Now referring to FIG. 1, the first two levels of a three case level-by-level mounting arrangement is illustrated with the second level of cases shown in an exploded arrangement with respect to the second mounting plate with two of the cases shown in phantom. Mounting plates 1 include apertures 3 into which resilient mounting tabs 4 are inserted and snapped into place to hold the cases to an upright position on the mounting plate 1. In FIG. 1 a first layer of cases 2 have been snapped into the lower or the first mounting plate 1 in the assembly and a second mounting plate 1 has been snapped into place on the top portion of cases 2. It will be observed that with the second mounting plate 1 snapped in place on the top of the first layer of cases that only one-half of the generally square-shaped aperture 3 has been utilized. The next layer of cases 2 may now be snapped into place on top of second mounting plate 1 with the resilient tabs on the lower end of the second layer of cases snapping into the unused portion of aperture 3. In a similar manner the third mounting plate may then be snapped onto the top of the second layer of cases and an additional layer of cases may be snapped thereon. It will be appreciated that almost an infinite number of levels of cases may be snapped into place on top of the assembly by utilizing additional mounting plates 1.

Figure 4:
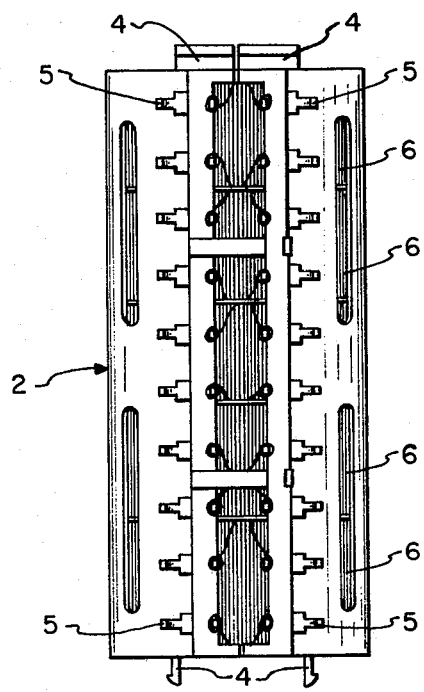
FIG. 4 is a view of one of the typical cases for the loading coils and is a more detailed view of the case and the terminal arrangements provided thereon.

Referring momentarily to FIG. 4, a more detailed view of case 2 is shown therein and it will be observed that the resilient tabs 4 on the bottom of the case have their longitudinal axis on lines generally parallel to the terminal means 5 which extend outward from the side of the case 2. Now looking at the top of case 2, resilient mounting tabs 4 are oriented such that their longitudinal axis is substantially perpendicular to the axis of the terminal means 5. With this orientation of the resilient mounting tabs it is possible to stack the cases such that the terminal means, which are to be connected to the cable stub coming into the case, may always be positioned such that the terminals are sticking outward and hence facilitate the easy wiring of the cable to the terminal means. Case 2 as illustrated in FIG. 4 includes five loading coils 6 with the appropriate leads being terminated on the terminal means 5, however any suitable number of loading coils or other electrical components could be utilized in the case by appropriately dimensioning case.

Now returning to FIG. 1 it can better be appreciated now after viewing the case in FIG. 4 that the additional levels of cases 2 to be mounted on top of the second mounting plate 1 may be positioned so that the terminal means 5 will extend outward since the alternating orientation of the resilient tab means 4 allow cases 2 to be inverted with respect to the case below and hence the lower mounting tabs 4 may be snapped into the unused area of aperture 3. Thus it will be appreciated that any reasonable number of levels of cases 2 may be snapped into place on the mounting plates 1 and then since all of the terminal means 5 will be extending outward with respect to the center of the stack appropriate wiring to the individual components may be made from individual leads 7 emanating from cable 8 to terminal means 5 of the loading coil cases 2. In the embodiment as illustrated in FIG. 1, individual leads 7 coming from cable 8 have been divided into three groups which may be brought up the sides of cases 2 and hence wired to the adjacent terminal means 5 of the various levels of cases. Once the desired number of levels of cases with coils included have been wired to the leads 7 of cable 8, then the entire group of coils with mounting places may then be hermetically sealed in a suitable case to provide electrical integrity and safety to the coils and connections thereto.

Figure 2:
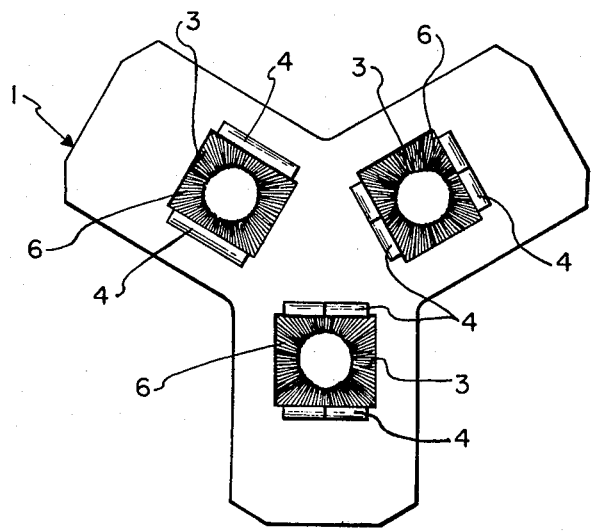
FIG. 2 is a view taken along lines 2—2 of FIG. 1.

Referring to FIG. 2, which is a view taken along the lines 2—2 of FIG. 1, apertures 3 and their relationship to mounting tabs 4 with respect thereto is better illustrated. It will be observed that aperture 3 is substantially square, however each side is indented slightly to allow resilient mounting tabs 4 to slide upward and into the space and leave a corresponding free space on the other pair of sides for the mounting tabs from an upper case 2 to slip into. The tabs on each ends of the cases are of identical widths and hence once the lower case with its tabs 4 have been snapped into the mounting plate 1, the space remaining for the mounting tabs 4 on the upper case 2 is not impeded by the lower tabs extending into the aperture 3.

Thus by indenting aperture 3 by the thickness of tab 4 adjacent to cases 2, the resilient tabs 4 on each end of cases 2 may be made of the same width and hence the tabs and apertures may be symmetrical thus eliminating any complicated arrangement which might not permit interchangeability of the cases.

Figure 3:
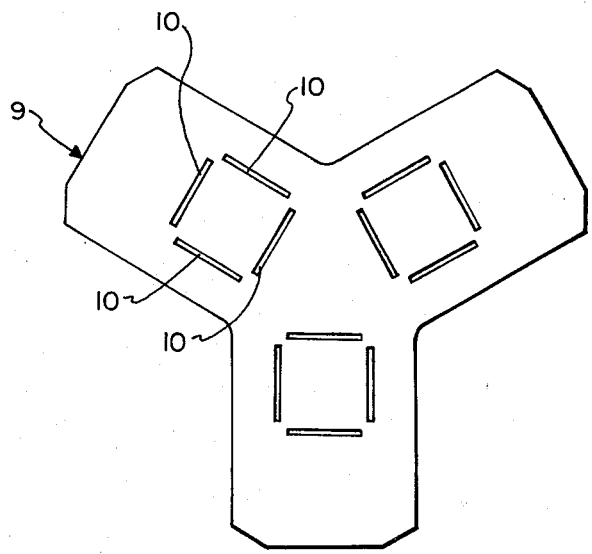
FIG. 3 is a top plan view of an alternate embodiment mounting plate for a three case per level arrangement.

FIG. 3 is a top plan view of an alternating mounting plate 9 which may be utilized with cases 2 of the present invention. Instead of having one generally square aperture 3 as illustrated in the mounting plate 1 embodiment, mounting plate 9 utilizes spaced apart pairs of apertures 10 for receiving resilient mounting tabs 4 of the cases 2 in a snap-in arrangement. Mounting plate 9 may be used in the construction of a level-by-level layer of cases 2 in the same manner as illustrated in FIG. 1 to build any desired number of levels of cases.

The embodiment in FIG. 1 is representative of a mounting arrangement in which the cable 8 is divided into three sections for connection to the components in cases 2, however it will of course be appreciated that mounting plate 1 could be expanded to have additional sections to facilitate adding a greater number of cases thereto.

Figure 5:
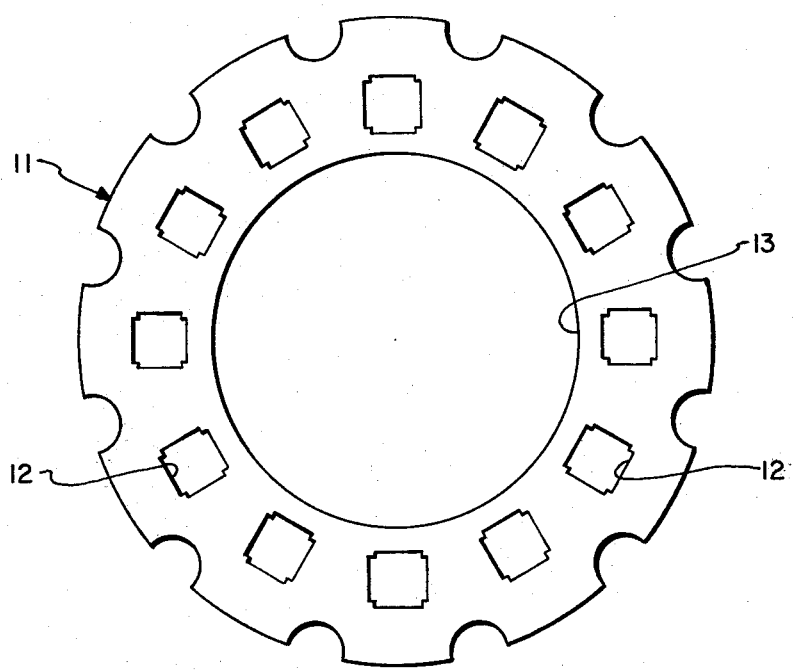
FIG. 5 is a top plan view of an alternative mounting plate of generally circular shape.

An alternative embodiment in which the main cable would enter through the center of the mounting plate and then extend upward and outward on a level-per-level basis is specifically contemplated and such an embodiment is illustrated in FIG. 5. Mounting plate 11 includes apertures 12 for receiving cases 2 in a snap-in arrangement with mounting tabs 4. The thickness of mounting plate 11 is determined by the length of tabs 4 as was true with mounting plate 1. Utilizing mounting plate 11 will provide capability to stack 12 cases on each level and by following the scheme of mounting plate, cases, mounting plate as illustrated in FIG. 1, any desired number of levels may be achieved. With the mounting plate 11, central aperture 13 provides space for the cable stub to be brought up through the center of the stack and appropriate leads brought out between adjacent upstanding cases to make the connections to the terminal means 5 on the cases 2.

I claim:

1. A stackable assembly for electrical components, comprising:
   a mounting plate having an aperture therethrough; a first container for an electrical component, said first container including resilient tabs on one end thereof, said tabs adapted to engageably snap into one portion of said aperture; a second container for an electrical component, said second container including resilient tabs on one end thereof, said tabs adapted to engageably snap into another portion of said aperture whereby said containers may be stacked on opposite sides of said mounting plate to form a stackable assembly.

2. The assembly as claimed in claim 1 wherein said tabs are arranged in spaced apart pairs.

3. The assembly as claimed in claim 1 wherein said aperture is substantially square and the tabs on said first container are adapted to engage one of the diametrically opposed sides of said square and the tabs on said second container are arranged to engage the other diametrically opposed sides of said square.

4. A mounting assembly for supporting multiple levels of electrical component containers, each level including a plurality of containers, said mounting arrangement comprising:
   first and second mounting plates having a plurality of apertures therein;
   a plurality of containers for electrical components, each said container including a pair of resilient mounting tabs on each end thereof, said tabs adapted to engage a portion of said apertures in said plates whereby one group of said containers may be snapped into and supported between said first and second mounting plates and other groups of containers may be supported on the free sides of said first and second mounting plates, one pair of tabs on said other groups of containers being insertable into unused portions of said apertures in said first and second mounting plates.

5. The mounting assembly as claimed in claim 4 wherein said apertures are substantially square.

6. The mounting assembly as claimed in claim 4 wherein said mounting plates are substantially circular.

7. The mounting assembly as claimed in claim 4 wherein said containers are cylindrically shaped.

8. The mounting assembly as claimed in claim 4 wherein said containers include terminal means extending perpendicularly therefrom.

9. The mounting assembly as claimed in claim 8 wherein the longitudinal axis of one pair of said resilient mounting tabs is lined parallel to the axis of said terminal means and the longitudinal axis of the other pair of resilient mounting tabs is perpendicular to the axis of said terminal means.

10. In an enclosure for holding a plurality of loading coils an improved mounting arrangement comprising:

a first mounting plate including a plurality of apertures; a set of cylindrical cases including loading coils therein, said cases having a pair of resilient mounting tabs on each end thereof with one pair of said tabs engaged in said aperture in said first mounting plate;

a second mounting plate, including a plurality of apertures, inserted over the tops of said first set of cases with the top mounting tabs of said cases engaging said apertures in said second mounting plate; and a second set of cylindrical cases including loading coils therein, said second set having a pair of resilient mounting tabs on each end thereof with one pair of said tabs inserted in said apertures of said second mounting plate whereby said second set of cases are supported by said second mounting plate.

11. The improved mounting arrangement as claimed in claim 10 wherein said cases include terminal means extending outward from the surface of said cases.

12. The improved mounting arrangement as claimed in claim 11 wherein said terminal means are aligned along a line parallel to the longitudinal axis of said case and wherein the tabs on one end of said cases are aligned such that the axis thereof are substantially parallel with the axis of said terminal means and the tabs on the other ends of said cases are aligned such that the longitudinal axis thereof are substantially perpendicular to the longitudinal axis of the tabs on the other end of said cases.

* * * * *